(12) United States Patent
Jiang et al.

(10) Patent No.: US 12,075,474 B2
(45) Date of Patent: Aug. 27, 2024

(54) TRANSMISSION TIME INDICATION METHOD FOR UNLICENSED BAND, NETWORK DEVICE AND TERMINAL

(71) Applicant: VIVO MOBILE COMMUNICATION CO., LTD., Guangdong (CN)

(72) Inventors: Lei Jiang, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 589 days.

(21) Appl. No.: 17/205,935

(22) Filed: Mar. 18, 2021

(65) Prior Publication Data

US 2021/0212120 A1   Jul. 8, 2021

Related U.S. Application Data

(63) Continuation of application No. PCT/CN2019/101705, filed on Aug. 21, 2019.

(30) Foreign Application Priority Data

Sep. 20, 2018 (CN) .......... 201811102328.9

(51) Int. Cl.
- *H04L 1/00* (2006.01)
- *H04W 72/0446* (2023.01)
- *H04W 72/23* (2023.01)
- *H04W 74/0816* (2024.01)

(52) U.S. Cl.
CPC ....... *H04W 74/0816* (2013.01); *H04L 1/0038* (2013.01); *H04W 72/0446* (2013.01); *H04W 72/23* (2023.01)

(58) Field of Classification Search
CPC .................................................... H04L 1/0038
See application file for complete search history.

(56) References Cited

U.S. PATENT DOCUMENTS

| 2016/0183249 | A1  | 6/2016  | Lei et al. |
| 2016/0227428 | A1* | 8/2016  | Novlan ............. H04W 48/16 |
| 2016/0366633 | A1  | 12/2016 | Luo et al. |
| 2017/0064737 | A1  | 3/2017  | Wang et al. |
| 2017/0339704 | A1  | 11/2017 | Matsumoto et al. |

(Continued)

FOREIGN PATENT DOCUMENTS

| CN | 104883242 A | 9/2015 |
| CN | 105530647 A | 4/2016 |

(Continued)

OTHER PUBLICATIONS

EP Search Report in Application No. 19862214.4 dated Oct. 26, 2021.

(Continued)

*Primary Examiner* — Shukri Taha
(74) *Attorney, Agent, or Firm* — Brooks Kushman P.C.

(57) ABSTRACT

Embodiments of the present disclosure provide a transmission time indication method for unlicensed band, a network device, and a terminal. The method includes: listening channel state; and when the channel state is idle, indicating first channel occupancy time (COT) information, where the first COT information is used to indicate a remaining COT of the network device.

20 Claims, 8 Drawing Sheets

(56) References Cited

U.S. PATENT DOCUMENTS

| | | | |
|---|---|---|---|
| 2018/0019836 A1 | 1/2018 | Kim et al. | |
| 2018/0027493 A1 | 1/2018 | Li et al. | |
| 2020/0008241 A1* | 1/2020 | Zhou | H04W 72/23 |
| 2021/0007101 A1* | 1/2021 | Tooher | H04W 72/0446 |
| 2022/0256601 A1* | 8/2022 | Harada | H04W 72/0446 |

FOREIGN PATENT DOCUMENTS

| | | |
|---|---|---|
| CN | 105933099 A | 9/2016 |
| CN | 106160954 A | 11/2016 |
| CN | 106171036 A | 11/2016 |
| CN | 106304371 A | 1/2017 |
| CN | 107113732 A | 8/2017 |
| CN | 107318171 A | 11/2017 |
| CN | 107948988 A | 4/2018 |
| IN | 105992373 A | 10/2016 |
| WO | 2016105129 A1 | 6/2016 |
| WO | 2016121730 A1 | 8/2016 |
| WO | 2017/189044 A1 | 11/2017 |
| WO | 2017/193843 A1 | 11/2017 |
| WO | 2020/030036 A1 | 2/2020 |

OTHER PUBLICATIONS

"NR numerology and frame structure for unlicensed bands" 3GPP TSG RAN WG1 Meeting #94, R1-1808058, Huawei, HiSilicon, Aug. 20, 2018.
1 JP Office Action in Application No. 2021-515487 Dated May 30, 2022.
Singapore Office Action issued in corresponding application No. 11202102776R, dated Oct. 31, 2022.
CN Office Action in Application No. 201811102328.9 dated Aug. 31, 2020.
"Channel Access Procedures for NR-U" Apple Inc., 3GPP TSG RAN WG1 Meeting #94, R1-1808611, Aug. 20, 2018.
"Discussion on physical DL channel design in unlicensed spectrum" 3GPP TSG RAN WG1 Meeting #94, R1-1808235, vivo, Aug. 20, 2018.
Written Opinion and International Search Report in Application No. PCT/CN2019/101705 dated Apr. 1, 2021.
First Office Action for Korean Application No. 10-2021-7011664, dated Mar. 28, 2024, 5 Pages.
Huawei, HiSilicon "Coexistence and channel access for NR unlicensed band operations" 3GPP TSG RAN WG1 Meeting #94, Gothenburg, Sweden, Aug. 2018, R1-1808061, 8 Pages.
Samsung "Frame structure for NR-U" 3GPP TSG RAN WG1 Meeting #94, Gothenburg, Sweden, Aug. 2018, R1-1808765, 6 Pages.
TCL Communication "Discussion on partial slot transmission in NR-U" 3GPP TSG RAN WG1 Meeting 94, Gothenburg, Sweden, Aug. 2018, R1-1809380, 7 Pages.

\* cited by examiner

TRANSMISSION TIME INDICATION METHOD FOR UNLICENSED BAND, NETWORK DEVICE AND TERMINAL

CROSS REFERENCE TO RELATED APPLICATIONS

This application is a continuation application of International Application No. PCT/CN2019/101705 filed on Aug. 21, 2019, which claims priority to Chinese Patent Application No. 201811102328.9 filed in China on Sep. 20, 2018, which is incorporated herein by reference in its entirety.

TECHNICAL FIELD

The present disclosure relates to the field of communications technologies, and in particular, to a transmission time indication method for unlicensed band, network device and terminal.

BACKGROUND

In future communication system, an unlicensed band may serve as supplement of a licensed band, to help an operator perform service capacity expansion. To keep consistent with the deployment of New Radio (NR) and maximize unlicensed access based on NR, an unlicensed band may work in frequency band of 5 GHz, 37 GHz and 60 GHz. A large bandwidth (80 or 100 MHz) in the unlicensed band can reduce the implementation complexity of base station (gNB) and User Equipment (UE). The unlicensed band is shared by a plurality of radio access technologies (RATs), for example, WiFi, radar and LTE-LAA. Therefore, in some countries or regions, the unlicensed band must comply with rules during usage to ensure that all devices can fairly use the resource, for example, comply with rules such as listen before talk (LBT) and maximum channel occupancy time (MCOT). When a transmission node needs to send information, and needs to perform LBT first, the energy detection (ED) on the surrounding nodes shall be performed. When the detected power is lower than a threshold value, it may be considered that the channel is idle, and the transmission node can send data. Otherwise, the channel is considered to be busy and the transmission node cannot send data. The transmission node can be base station, UE and WiFi access point (AP) etc. After the transmission node starts to transmit, the channel occupancy time (COT) cannot be greater than MCOT.

In an unlicensed band, due to the uncertainty of the channel state, UE cannot predict when the base station can seize the channel, or how much time the base station needs for transmission after seizing the channel. Since there is no cell-specific reference signal (CRS) in NR, UE needs to perform physical downlink control channel (PDCCH) blind detection every time, no matter whether there is data or not. In addition, UE needs to detect every possible transmission starting position of gNB, such as symbol #0 and symbol #7. PDCCH detection frequency is relatively high. When the signal is detected, UE only needs to detect PDCCH at the initial position of each slot within the channel occupancy time of gNB. However, because UE doesn't know the COT of gNB, the terminal doesn't know when to start PDCCH detection on a basis of slot. Therefore, the detection mechanism of related technologies results in high power consumption of the terminal.

SUMMARY

According to a first aspect, an embodiment of the present disclosure provides a transmission time indication method for unlicensed band, applied to a network device, and including:

listening channel state; and when the channel state is idle, indicating first channel occupancy time (COT) information, where the first COT information is used to indicate a remaining COT of the network device.

According to a second aspect, embodiments of the present disclosure provide a transmission time indication method for unlicensed band, applied to a terminal, and including:

receiving first channel occupancy time (COT) information, where the first COT information is used to indicate a remaining COT; and performing physical downlink control channel (PDCCH) blind detection within the remaining COT.

According to a third aspect, an embodiment of the present disclosure provides a network device, and including:

a listening module, configured to listen channel state; and a sending module, configured to indicate first channel occupancy time (COT) information when the channel state is idle, where the first COT information is used to indicate a remaining COT of the network device.

According to a fourth aspect, an embodiment of the present disclosure provides a terminal, and including:

a receiving module, configured to receive first COT information, where the first COT information is used to indicate a remaining COT; and a detection module, configured to perform physical downlink control channel (PDCCH) blind detection within the remaining COT.

According to a fifth aspect, embodiments of the present disclosure provide a network device, including: a memory, a processor, and a program stored in the memory and executable on the processor. When the program is executed by the processor, the steps of the transmission time indication method for unlicensed band are performed.

According to a sixth aspect, embodiments of the present disclosure provide a terminal, including: a memory, a processor, and a computer program stored in the memory and executable on the processor. When the program is executed by the processor, the steps of the transmission time indication method for unlicensed band are performed.

According to a seventh aspect, embodiments of the present disclosure provide a computer-readable storage medium. The computer-readable storage medium stores a computer program, and when the computer program is executed by a processor, the steps of the transmission time indication method for unlicensed band on the network device side can be achieved, or when the computer program is executed by a processor, the steps of the transmission time indication method for unlicensed band on the terminal side can be achieved.

BRIEF DESCRIPTION OF DRAWINGS

To better clarify the technical solution of the embodiments of the present disclosure, the accompanying drawings required to illustrate the embodiments of the present disclosure will be simply described below. Obviously, the accompanying drawings described below merely illustrate some embodiments of the present disclosure. Those ordinarily skilled in the art can obtain other accompanying drawings without creative labor on the basis of those accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. Embodiments of the present disclosure provide a transmission time indication method for unlicensed band, network device and terminal that may be applied to a wireless communication system. The wireless communications system may be a 5G system, an evolved Long Term Evolution (eLTE) system, or a subsequent evolved communications system.

Figure 1:
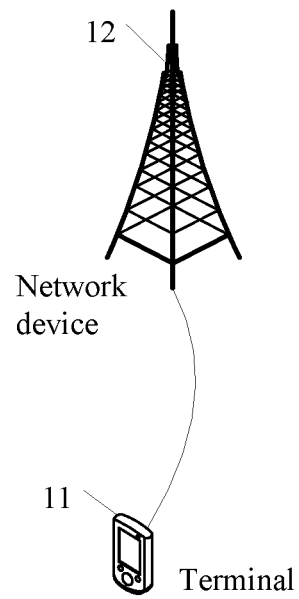
FIG. 1 is a structural diagram of a network system that can be applied in this embodiment of the present disclosure.

FIG. 1 is a structural diagram of a network system that can be applied in this embodiment of the present disclosure. As shown in FIG. 1, the network system includes: a terminal 11 and a network device 12, where the terminal 11 may be a user terminal or other terminal equipment, for example, may be a terminal side device such as a mobile phone, a tablet personal computer, a laptop computer, a personal digital assistant (PDA), a mobile internet device (MID) or a wearable device. It should be noted that a specific type of the terminal 11 is not limited in the embodiments of the present disclosure. The network device 12 may be a base station in 5G or later releases, or a base station in other communications systems, or is referred to as a Node B, an evolved Node B, a transmission reception point (TRP), an access point (AP), or other words in the field, as long as the same technical effect is achieved. The network device is not limited to specific technical words. In addition, the network device 12 may be a master node (MN) or a secondary node (SN). It should be noted that in embodiments of the present disclosure, only the 5G base station is used as an example, but a specific type of the network device is not limited.

Figure 2:
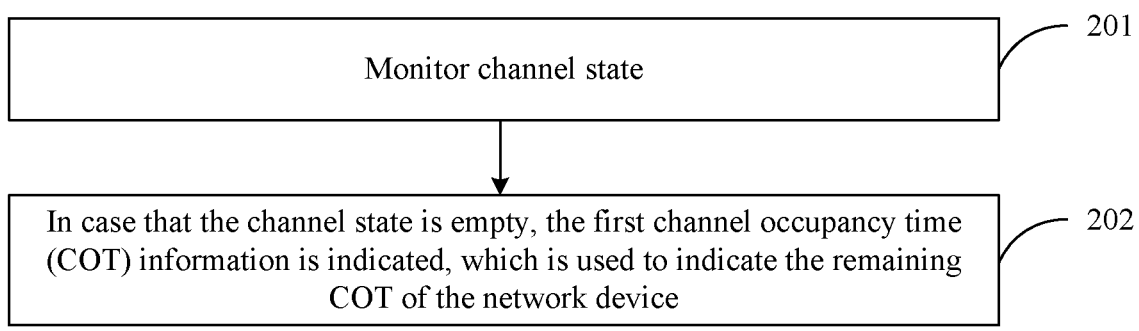
FIG. 2 is a flowchart of a transmission time indication method for unlicensed band according to an embodiment of the present disclosure.

Referring to FIG. 2, FIG. 2 is a flowchart of a transmission time indication method for unlicensed band according to an embodiment of the present disclosure. The transmission time indication method for unlicensed band, as shown in FIG. 2, may include the following steps:

Step 201: Listen Channel State.

A transmission time indication method for unlicensed band according to an embodiment of the present disclosure is mainly applied to network devices. When a network device needs to send data, the network device may first perform LBT and detect the power of surrounding nodes to listen the channel state. Specifically, when the detected power is lower than a threshold value, it may be considered that the channel is idle, and the network device can send data. Otherwise, the channel is considered to be busy and the network device cannot send data.

Step 202: When the channel state is idle, indicate first channel occupancy time (COT) information, where the first COT information is used to indicate a remaining COT of the network device.

When a network device needs to send data, the network device is generally required to determine the total COT based on data sent. The total COT shall be less than MCOT, for example, if MCOT of 4 ms, the total COT may be 3 ms. When the channel state detected by the network device is idle, the first COT information is indicated. The total COT is calculated from the start of actual transmission of the channel. The remaining COT is the channel occupancy time that remains after the slot indicating the first COT information is removed from the total COT, and can also represent the remaining channel occupancy time calculated from the slot indicating the first COT information.

After receiving the COT information indicated by the network device, the terminal decides the time of subsequent PDCCH blind detection based on the remaining COT.

PDCCH detection, which is also known as full PDCCH detection is performed according to the PDCCH listening period. Specifically, the terminal enables PDCCH blind detection within the COT and disables PDCCH blind detection after the remaining COT.

In the embodiments of the present disclosure, when the channel state is idle, the network device indicates the first COT information, thereby informing the terminal of the remaining COT. Therefore, the terminal can enable PDCCH blind detection within the remaining COT and disable PDCCH blind detection after the remaining COT. In this way, the power consumption of the terminal can be reduced in this embodiment of the present disclosure.

It should be noted that the unit of the remaining COT (i.e. time granularity) can be set according to actual needs. For example, in the embodiment of the present disclosure, a unit of the remaining COT may be millisecond, subframe, slot, mini-slot or symbol. For example, if millisecond is used as the unit of the remaining COT, the remaining COT can be expressed as N milliseconds; if subframe is used as the unit of the remaining COT, the remaining COT can be expressed as N subframes; if mini-slot is used as the unit of the remaining COT, the remaining COT can be expressed as N mini-slots; and if slot is used as the unit of the remaining COT, the remaining COT can be expressed as N slots.

Further, the format of the remaining COT can be expressed as either an integer or a decimal. Optionally, to reduce the difficulty of indication, the remaining COT is expressed as an integer in the embodiment of the present disclosure. Specifically, in an embodiment, the remaining COT is obtained by rounding up the actual remaining time based on the time granularity of the remaining COT. For example, if the actual remaining COT is greater than 2 ms and less than 3 ms, the value of the remaining COT is 3 ms. In this way, the PDCCH blind detection can be enabled in all transmission slots to avoid data missing, thereby ensuring the reliability of data transmission. In another embodiment, the remaining COT is obtained by rounding down the actual remaining time based on the time granularity of the remaining COT. In this case, to avoid data missing, it can be agreed on in advance in protocol to add one time unit to the received remaining COT. For example, if the actual remaining COT time is greater than 2 ms and less than 3 ms, the value of the remaining COT is 2 ms. The PDCCH blind detection can be enabled within 3 ms when the terminal receives the remaining COT of 2 ms. For better understanding of the present disclosure, the remaining COT is obtained by rounding up the actual remaining time based on the time granularity of the remaining COT, and the following embodiments are described in detail.

In an optional embodiment, the indicating the first channel occupancy time COT information includes:

indicating the first COT information in a first slot, a first partial slot or a first mini-slot for transmission.

Figure 3:
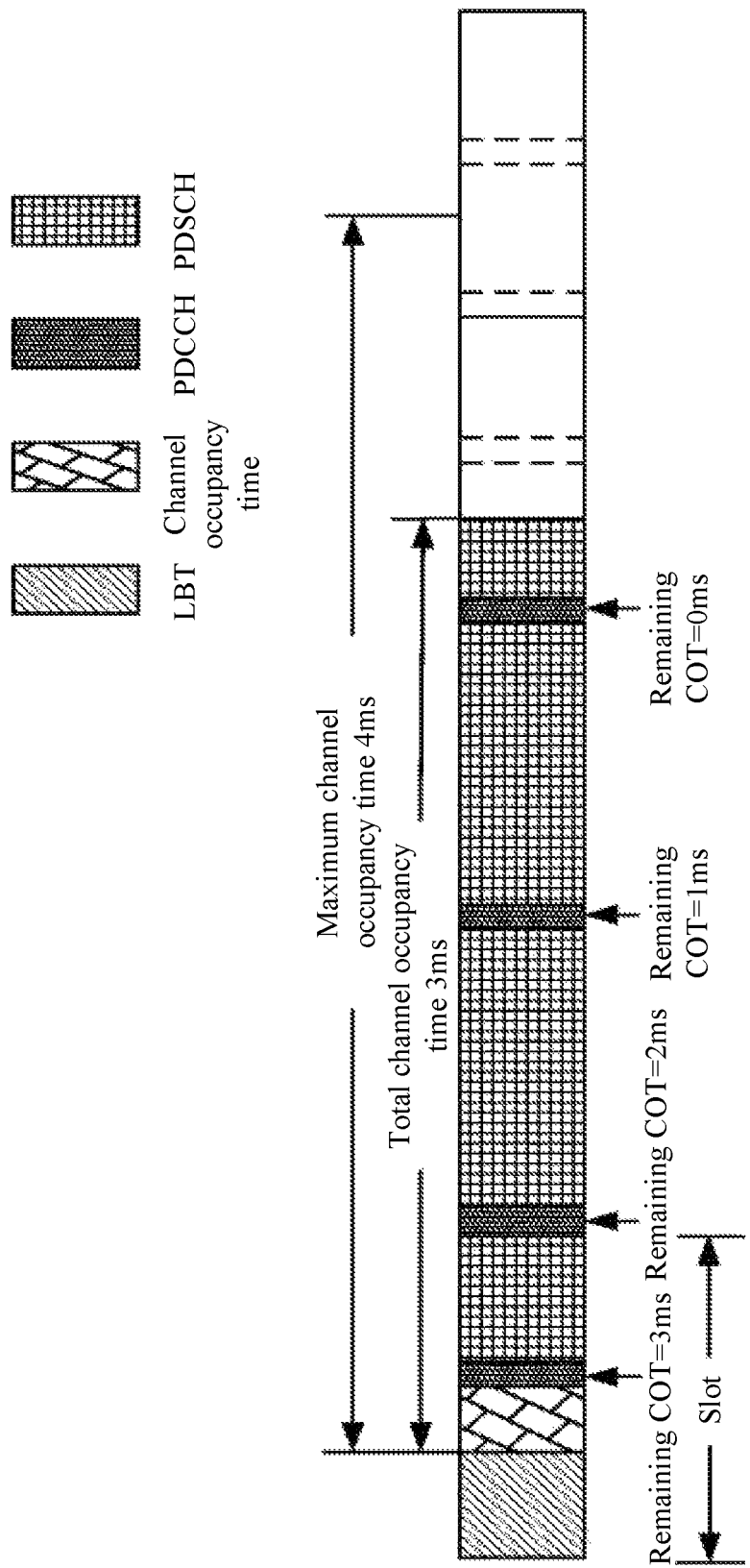
FIG. 3 is a schematic diagram 1 where the subcarrier spacing is 15 KHz and the remaining COT is indicated in the first COT information in a transmission time indication method for unlicensed band according to an embodiment of the present disclosure.
Figure 5:
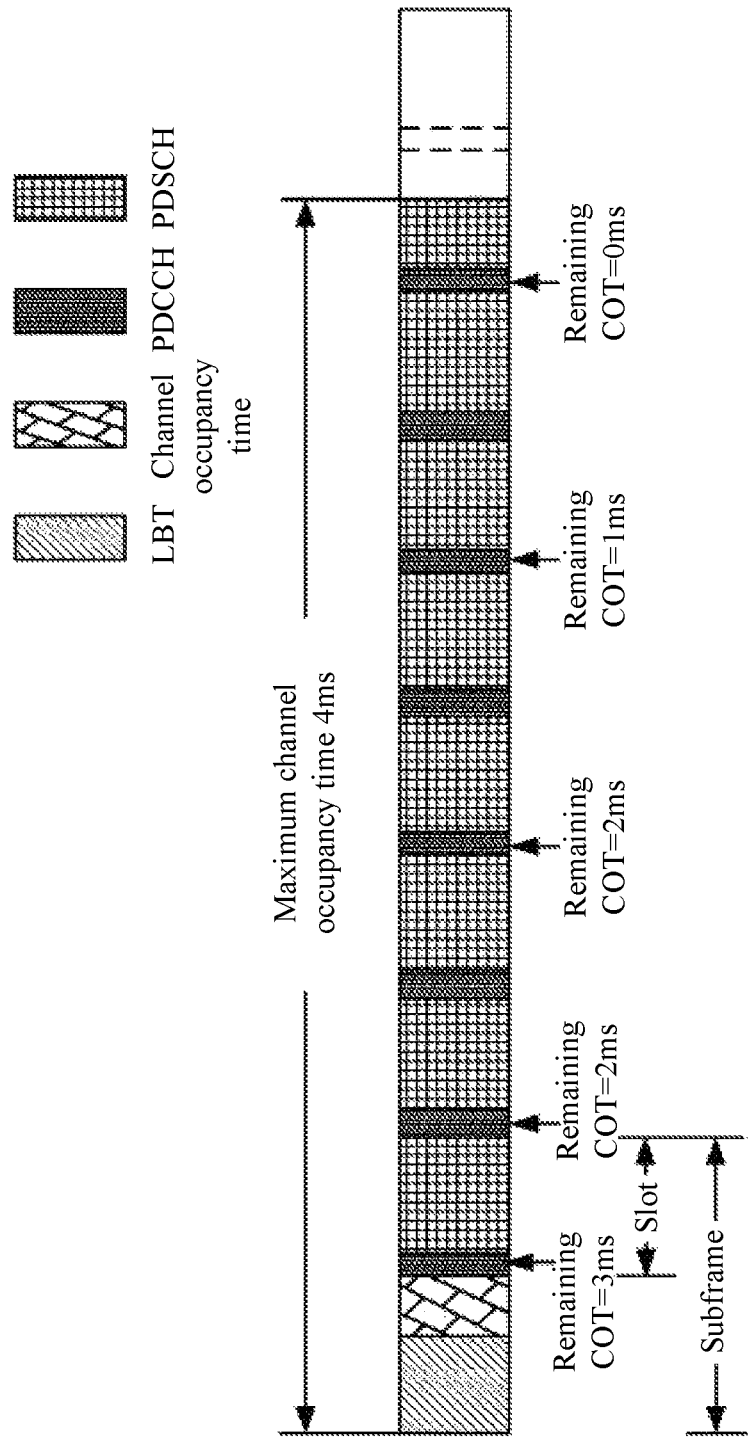
FIG. 5 is a schematic diagram 1 where the subcarrier spacing is 30 KHz and the remaining COT is indicated in the first COT information in a transmission time indication method for unlicensed band according to an embodiment of the present disclosure.

Specifically, due to different subcarrier spacings, the division of the corresponding transmission slots is also different. As shown in FIG. 3 and FIG. 5, FIG. 3 is a schematic diagram where the subcarrier spacing is 15 KHz and the remaining COT is indicated, and FIG. 5 is a schematic diagram where the subcarrier spacing is 30 KHz and the remaining COT is indicated. In FIG. 3, the first slot includes LBT time, channel reservation of the channel occupancy time (also known as the gap between LBT and the first partial slot for transmission) and the first partial slot for transmission. In this case, the first COT information can be indicated in the first partial slot for transmission. In FIG. 5, the first slot for transmission is a complete slot. In this case, the first COT information can be indicated in the first slot for transmission.

Considering the terminal of discontinuous reception (DRX), if the first COT information is only indicated in the first slot for transmission, partial slot or mini-slot, and the terminal of discontinuous reception is in the DRX-OFF (DRX-OFF) state, the first COT information cannot be received. Further, to ensure that all terminals can obtain the remaining COT, the first COT information can be indicated periodically, so that the terminals can receive the remaining COT information in the DRX-ON (DRX-ON) state. For example, in this embodiment, after the first COT information is indicated in the first slot, a first partial slot or a first mini-slot for transmission, the indicating the first channel occupancy time COT information further includes: indicating first COT information periodically.

In the foregoing method, the first COT information is updated in each period, and the corresponding first COT information is indicated in each period.

A unit of the period of indicating the foregoing first COT information may be millisecond, subframe or slot. The duration of period can be set according to actual needs. For example, if the unit of a period is ms, M milliseconds can be taken as a period; if the unit of a period is subframe, M subframes can be taken as a period; and if the unit of a period is slot, M slots can be taken as a period. In the embodiment of the present disclosure, the period includes at least one slot, and the first COT information is located in any slot in the period.

Figure 4:
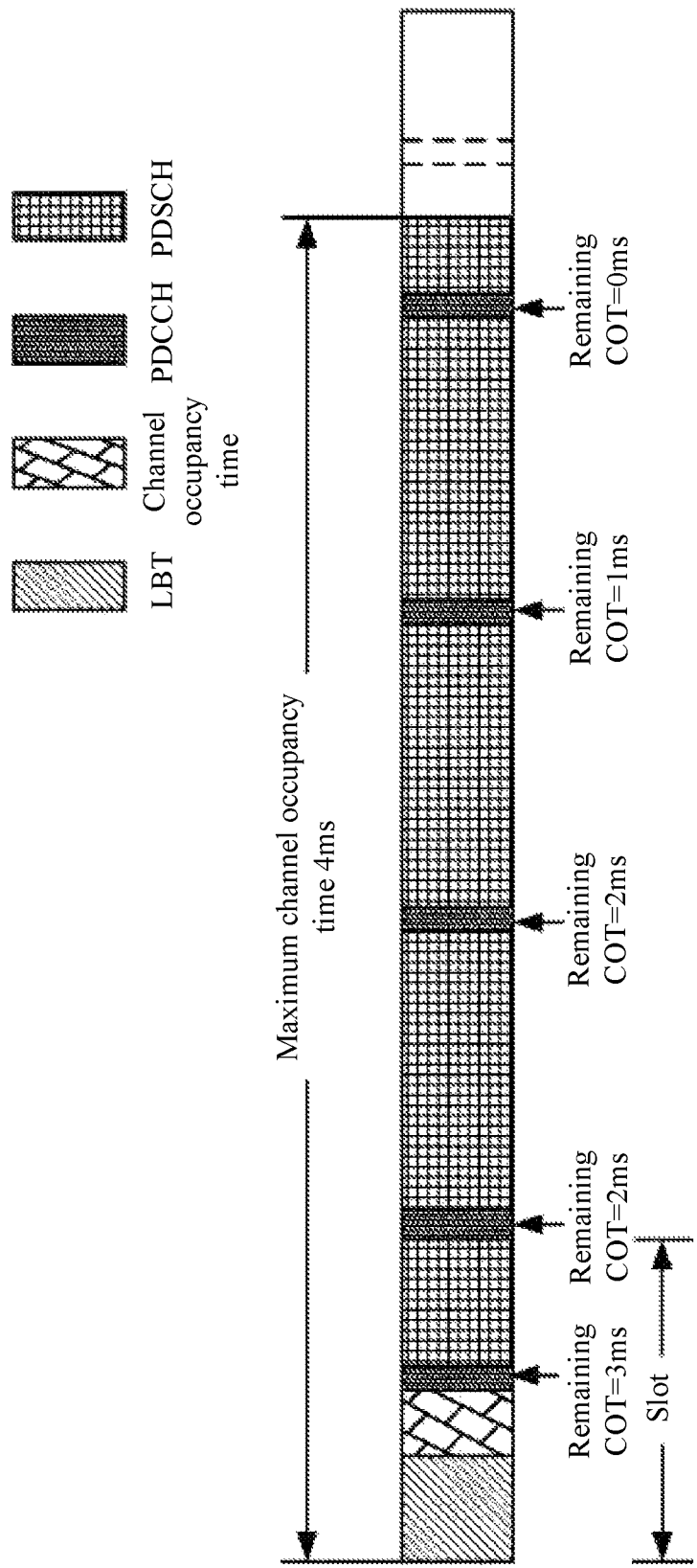
FIG. 4 is a schematic diagram 2 where the subcarrier spacing is 15 KHz and the remaining COT is indicated in the first COT information in a transmission time indication method for unlicensed band according to an embodiment of the present disclosure.

As shown in FIG. 3 and FIG. 4, when the subcarrier spacing is 15 KHz, 1 ms, 1 subframe or 1 slot can be taken as a period to indicate the first COT information periodically. In this case, a period only includes one slot, and the first COT information is indicated in each slot.

Figure 6:
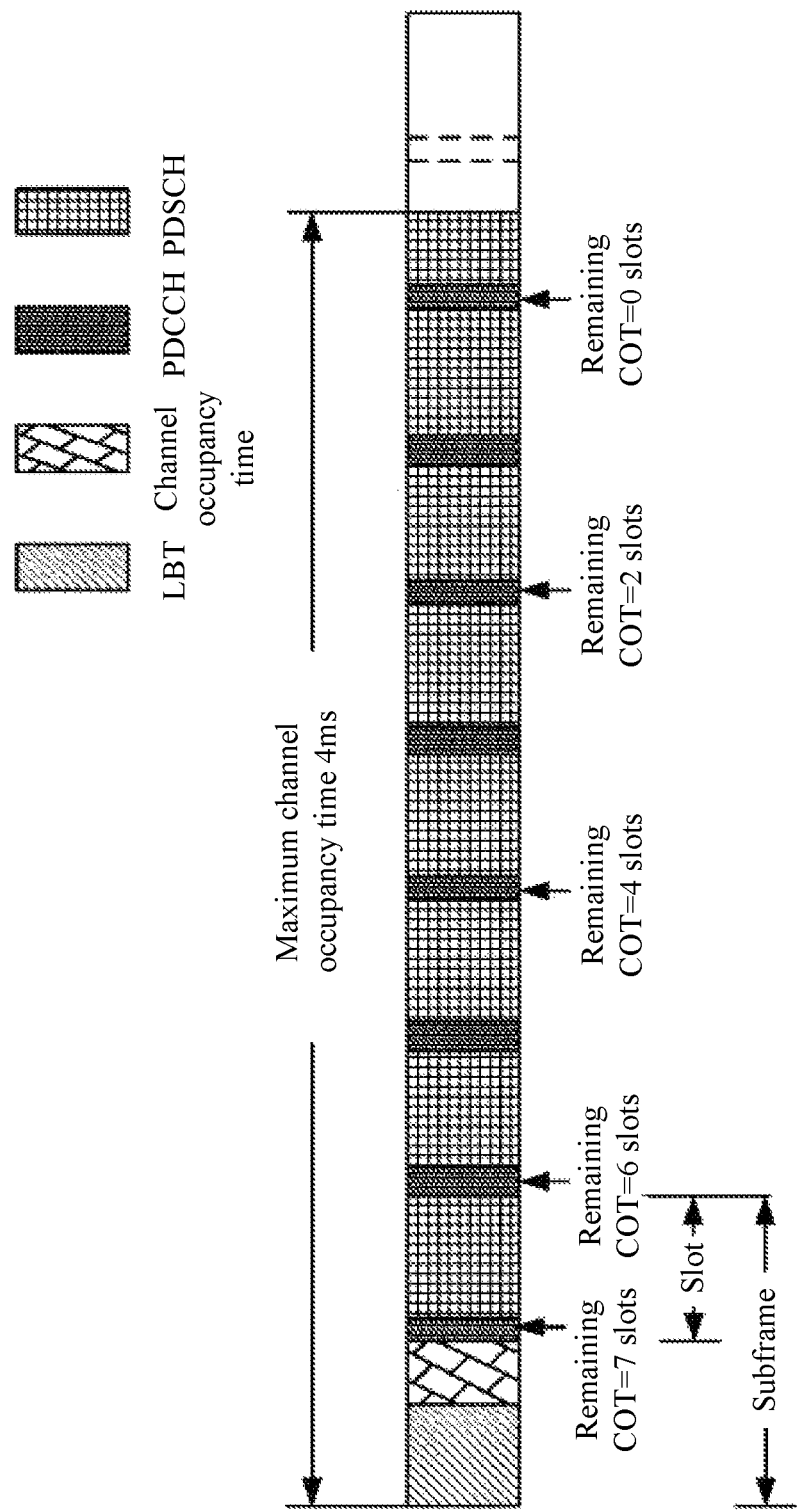
FIG. 6 is a schematic diagram 2 where the subcarrier spacing is 30 KHz and the remaining COT is indicated in the first COT information in a transmission time indication method for unlicensed band according to an embodiment of the present disclosure.

As shown in FIG. 5 and FIG. 6, when the subcarrier spacing is 30 KHz, 1 ms, 1 subframe or 2 slots can be taken as a period to indicate the first COT information periodically. In this case, a period includes two slots, and in each period, the first COT information can be indicated in the first slot or in the last slot. It should be understood that since the first COT information is periodically indicated, the location of slot used to indicate the first COT information is the same in each period.

Figure 7:
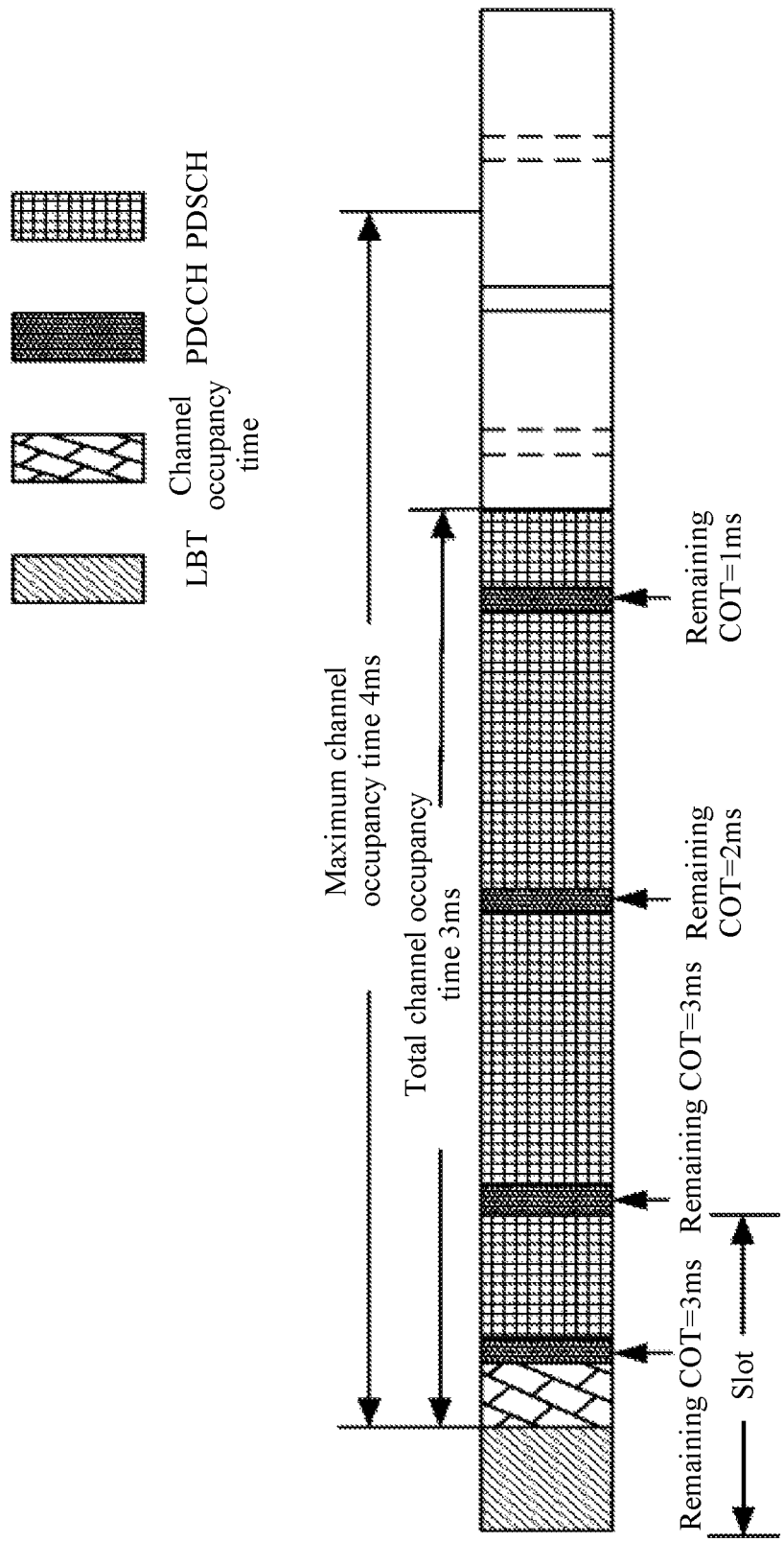
FIG. 7 is a schematic diagram 3 where the subcarrier spacing is 15 KHz and the remaining COT is indicated in the first COT information in a transmission time indication method for unlicensed band according to an embodiment of the present disclosure.

For better understanding of the definition of the remaining COT, it is described below with FIG. 3 and FIG. 7. As shown in FIG. 3, in an embodiment, the remaining COT is calculated by removing the slot currently indicating the first COT information. The total COT of a network device is 3 ms, the first partial slot for transmission indicates the remaining COT=3 ms, indicating that the remaining COT is 3 ms after removing the partial slot currently indicating the first COT information. Specifically, the time granularity of COT is ms, the total COT is 3 ms, and the total COT includes the channel reservation. The calculated actual remaining time is less than 3 ms. In this case, the actual remaining time is rounded up to 3 ms, and the first partial slot for transmission indicates that the remaining COT=3 ms. Similarly, the first full slot (that is, the slot of the first period) indicates that the remaining COT=2 ms, and the actual remaining time is less than 2 ms, and rounded up to 2 ms. As shown in FIG. 7, in another embodiment, the remaining COT is calculated from the slot currently indicating the first COT information. The total COT of a network device is 3 ms, the first partial slot for transmission indicates the remaining COT=3 ms, indicating that the remaining COT is 3 ms, calculated from the partial slot currently indicating the first COT information.

Specifically, the time granularity of COT is ms, the total COT is 3 ms, and the total COT includes the channel reservation. The calculated actual remaining time is less than 3 ms. In this case, the actual remaining time is rounded up to 3 ms, and the first partial slot for transmission indicates that the remaining COT=3 ms. Similarly, the first full slot (that is, the slot of the first period) indicates that the remaining COT=3 ms, and the actual remaining time is less than 3 ms, and rounded up to 3 ms. The second full slot (that is, the slot of the second period) indicates that the remaining COT=2 ms, and the actual remaining time is less than 2 ms, and rounded up to 2 ms.

Further, the fact that the total COT of a network device will change according to the actually transmitted data in the process of data transmission is considered. For example, in the process of data transmission, when new data arrives or any data needs to be retransmitted, the network equipment will increase the COT to transmit the new data or the data that needs to be retransmitted. In this case, the total COT will be increased; new data transmission shall be initial transmission of new data, and data retransmission shall only involve data that needs to be retransmitted due to transmission failure or other factors. When the total COT increases, the remaining COT indicated by the next slot may be more than that indicated by the previous slot. Specifically, in the embodiment, if the total COT does not change, the remaining COT corresponding to the first COT information indicated in each period gradually decreases, as shown in FIG. 3. When the total COT of a network device increases, the first COT information indicated in the next period will be obtained based on the first COT information indicated in the previous period and the increased channel occupancy time; as shown in FIG. 4, the remaining COT indicated in the second full slot is equal to the remaining COT indicated in the first full slot. It should be noted that if the increased channel occupancy time is greater than 1 unit time, the remaining COT indicated in the second full slot can be greater than the remaining COT indicated in the first full slot.

For example, as shown in FIG. 4, if the first full slot indicates the remaining COT=2 ms and new data arrives, resulting in the increase of total COT by 1 ms, the remaining COT indicated in the second full slot can be calculated based on the remaining COT indicated in the first full slot and the increased channel occupancy time of 1 ms. In the embodiment, the remaining COT indicated in the second full slot is consistent with that indicated in the first full slot, both of which are 2 ms. Therefore, in the embodiment, the remaining COT is not monotonically decreasing. When new data arrives, adjustment will be made to ensure the integrity of PDCCH detection and avoid data loss.

It should be understood that the remaining COT can be indicated in different units, and the size of the corresponding remaining COT is also different. As shown in FIG. 5 and FIG. 6, in an embodiment, when the remaining COT is updated periodically in unit of 1 ms or 1 subframe, if the subcarrier spacing is greater than 15 kHz, the first COT information is updated and indicated every 2n slots, and n is equal to the ratio of the current subcarrier spacing and 15 kHz. Then the first COT information is updated with ms or subframe as the time granularity, and the first COT information can be indicated in the first slot or the last slot of a subframe. In FIG. 5, the remaining COT is expressed in ms. In addition to the first COT information indicated in the first slot for transmission, the first COT information indicated in each period is indicated in the first slot of a subframe. As shown in FIG. 6, when the remaining COT is indicated in slot, the first COT information can be updated with ms or subframe as the time granularity. As shown in FIG. 6, n=2=30 KHz/15 KHz.

For autonomous UL transmission or configured grant transmission of a terminal, it should be noted that the remaining COT of the terminal can also be indicated according to the time slot indication rules in the above embodiment. When the remaining COT of the terminal is indicated, the remaining COT of the terminal can be indicated by adding bits to the uplink control information (UCI). For example, after LBT detects that the channel is idle, the remaining COT of the terminal can be indicated in the first slot, a first partial slot or a first mini-slot for transmission. Further, after the remaining COT of terminal is indicated in the first slot, partial slot or mini-slot for transmission, the remaining COT of the terminal can also be periodically indicated. For the specific implementation process, refer to the foregoing embodiment. To avoid repetition, details are not described herein again.

Further, the first COT information may be carried by the initial signal, downlink control information (DCI) or sequence.

In an embodiment, the first COT information may be carried by the initial signal, and the initial signal may be carried by physical downlink control channel (PDCCH), or the initial signal is located in the first preset location in the domain of the PDCCH.

Specifically, in one embodiment, when the initial signal is carried by PDCCH, the terminal detects the initial signal based on PDCCH DCI and one or more of the following information of network configuration:
1. Period;
2. Offset;
3. Control resource set (CORESET);
4. Downlink Control Information (DCI) format and/or Downlink Control Information (DCI) size;
5. Control Channel Elements aggregation (CCE) Aggregation Level (AL);
6. Blind detection candidate (BD candidate).

After the terminal detects the PDCCH DCI as the initial signal, it obtains the remaining COT of the network device based on the instructions therein. The terminal can only detect the initial signal outside the remaining COT. After detecting the initial signal (in any form), the terminal will start one of the following conventional operations:
1. Conventional PDCCH listening;
2. Channel State Information (CSI) measurement, such as channel and/or interference measurement.

In another embodiment, the initial signal can also be sent as an independent signal at a fixed location in the domain of the PDCCH. The fixed location is the first preset location. To avoid repetition, details of specific location setting are not described herein again.

Optionally, in another embodiment, the first COT information may be carried by preamble, and the preamble is located at the second preset location in the domain of the PDCCH.

In the embodiment of the present disclosure, the preamble can be WiFi-like preamble or other forms of preamble. Specifically, the network device can indicate the remaining COT of a network device in a fixed location through WiFi-like preamble or another sequence, for example, the corresponding sequence is sent in the first symbol of PDCCH.

Optionally, in another embodiment, the first COT information may be carried by DCI, and the DCI may be carried in Group common PDCCH (GC-PDCCH). The first COT information is indicated in a preset format; or the first COT message is indicated by reusing the GC-PDCCH format, and the first COT message temporarily identifies RNTI scrambling through a new wireless network, where the preset format is different from the GC-PDCCH format. The GC-PDCCH format is a GC-PDCCH format in the related technologies, and the first preset format is a new DCI format. The DCI may also be carried by DCI of the uplink or downlink scheduling PDCCH, and the first COT message is indicated by adding a domain in the DCI.

Further, in an optional embodiment, before the foregoing step 201, the method also includes:

After the second COT information is received, the COT ending time of a neighbor cell network device is determined based on the second COT information. The COT ending time is used to determine the time of listening channel state. The second COT information is sent by the neighbor cell network device, and the second COT information is used to indicate the remaining COT of the neighbor cell network device.

The remaining COT sent by the network device can be received both by the terminal and other neighbor cell network devices, and the remaining COT sent by other neighbor cell network devices can also be received by the foregoing network device. As the channel is occupied by neighbor cell network devices, the network device cannot transmit data. To reduce the LBT time of the network device, the time to start LBT can be determined based on the COT ending time of neighbor cell network devices. Specifically, in the embodiment of the present disclosure, the step 201 may include:

starting to listen the channel state at the COT ending time; or listening the channel state from the previous slot/subframe before the COT ending time.

In this way, the start of channel state listening at the COT ending time can avoid unnecessary channel listening by the network device when neighbor cell network devices are transmitting data, thereby reducing the power consumption of network devices. It should be noted that the time between the network device and neighbor cell network devices is synchronous. The network device and neighbor cell network devices can belong to the same operator or different operators.

Figure 8:
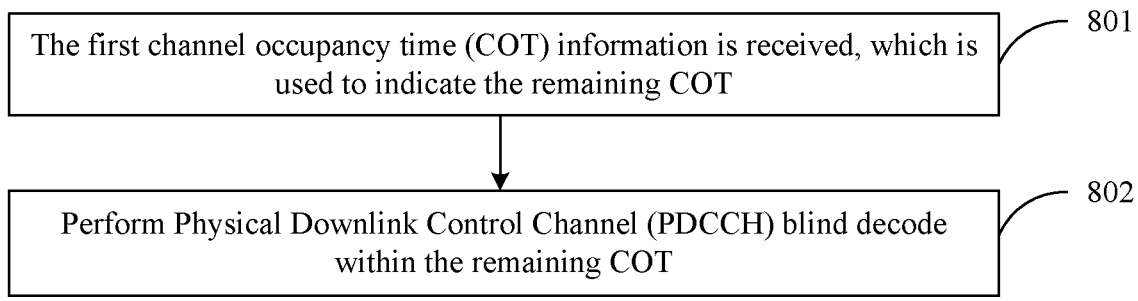
FIG. 8 is a flowchart of another transmission time indication method for unlicensed band according to an embodiment of the present disclosure.

FIG. 8 is a flowchart of another transmission time indication method for unlicensed band according to an embodiment of the present disclosure. The indication method, applied to a terminal, as shown in FIG. 8, may include the following steps:

Step 801: Indicate first channel occupancy time (COT) information, where the first COT information is used to indicate a remaining COT.

Step 802: Perform Physical Downlink Control Channel (PDCCH) blind detection within the remaining COT.

Optionally, the receiving first channel occupancy time COT information includes:

receiving the first COT information in a first slot, a first partial slot or a first mini-slot for transmission.

Optionally, after the first COT information is received in the first slot, partial slot or mini-slot for transmission, the receiving first channel occupancy time COT information also includes:

receiving first COT information periodically.

Optionally, a unit of the period of the first COT information received may be millisecond, subframe or slot.

Optionally, the period includes at least one slot, and the first COT information is located in any slot in the period.

Optionally, a unit of the remaining COT may be millisecond, subframe, slot, mini-slot or symbol.

Optionally, the remaining COT is a value obtained by rounding up the actual remaining time in the unit of the remaining COT; or the remaining COT is a value obtained by rounding down the actual remaining time in the unit of the remaining COT.

Optionally, the first COT information may be carried by the initial signal, Downlink Control Information (DCI) or sequence.

Optionally, the initial signal may be carried by Physical Downlink Control Channel (PDCCH), or the initial signal is located in the first preset location in the domain of the PDCCH.

Optionally, the sequence is located in the second preset location in the domain of the PDCCH.

It should be noted that the embodiment is an embodiment of the terminal corresponding to the embodiment shown in FIG. 2. For the specific implementation mode, refer to the relevant description of the embodiment shown in FIG. 2. The same technical effects can be achieved. To avoid repetition, details are not described herein again.

Figure 9:
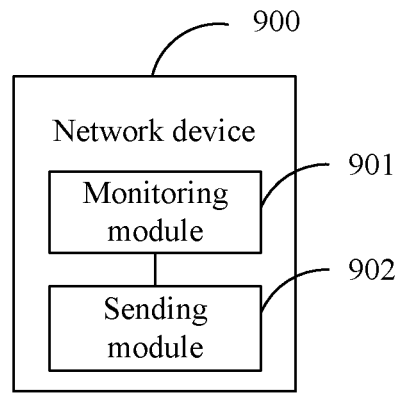
FIG. 9 is a structural diagram of a network device according to an embodiment of the present disclosure.

FIG. 9 is a diagram of a network system structure according to an embodiment of the present disclosure. As shown in FIG. 9, a network device 900 includes:

a listening module 901, configured to listen channel state; and a sending module 902, configured to indicate first channel occupancy time (COT) information when the channel state is idle, where the first COT information is used to indicate a remaining COT of the network device.

Optionally, the sending module 902 is used to indicate the first COT information indicated in a first slot, partial slot or mini-slot for transmission.

Optionally, after the first COT information is indicated in the first slot, a first partial slot or a first mini-slot for transmission, the sending module 902 is also used to indicate the first COT information periodically.

Optionally, a unit of the period of indicating the first COT information may be millisecond, subframe or slot.

Optionally, the period includes at least one slot, and the first COT information is located in any slot in the period.

Optionally, if the total channel occupancy time of a network device increases, the first COT information indicated in the next period can be obtained based on the first COT information indicated in the previous period and the increased channel occupancy time.

Optionally, a unit of the remaining COT may be millisecond, subframe, slot, mini-slot or symbol.

Optionally, the remaining COT is a value obtained by rounding up the actual remaining time in the unit of the remaining COT; or the remaining COT is a value obtained by rounding down the actual remaining time in the unit of the remaining COT.

Optionally, the first COT information may be carried by the initial signal, Downlink Control Information (DCI) or sequence.

Optionally, the initial signal may be carried by Physical Downlink Control Channel (PDCCH), or the initial signal is located in the first preset location in the domain of the PDCCH.

Optionally, the sequence is located in a second preset location in the domain of the PDCCH.

Optionally, before listening channel state, the network device also includes:

a processing module: configured to: after the second COT information is received, determine the COT ending time of a neighbor cell network device based on the second COT information, where the COT ending time is used to determine the time of listening channel state, the second COT information is sent by the neighbor cell network device, and the second COT information is used to indicate the remaining COT of the neighbor cell network device.

Optionally, the listening module is specifically configured to listen the channel state at the COT ending time; or to listen the channel state from the previous slot/subframe before the COT ending time.

A network device according to an embodiment of the present disclosure can implement the processes of the network device in the embodiment in FIG. 2. To avoid repetition, details are not described herein again. The resource overhead of the configuration can be reduced.

Figure 10:
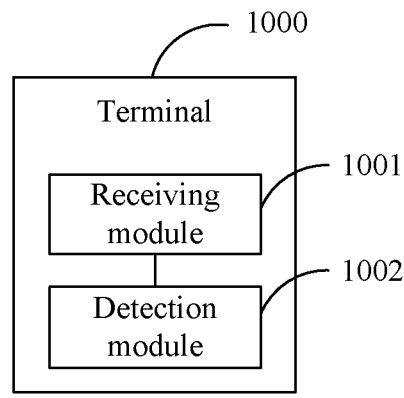
FIG. 10 is a structural diagram of a terminal according to an embodiment of the present disclosure.

FIG. 10 is a diagram of a terminal structure according to an embodiment of the present disclosure. As shown in FIG. 10, a terminal 1000 includes:

a receiving module 1001, configured to receive first COT information, where the first COT information is used to indicate a remaining COT; and a detection module 1002, configured to perform physical downlink control channel (PDCCH) blind detection within the remaining COT.

Optionally, the receiving module 1001 is specifically used to receive the first COT information indicated in a first slot, a first partial slot or a first mini-slot for transmission.

Optionally, after the first COT information is received in a first slot, a first partial slot or a first mini-slot for transmission, the receiving module 1001 is also used to receive the first COT information periodically.

Optionally, a unit of the period of the first COT information received may be millisecond, subframe or slot.

Optionally, the period includes at least one slot, and the first COT information is located in any slot in the period.

Optionally, a unit of the remaining COT may be millisecond, subframe, slot, mini-slot or symbol.

Optionally, the remaining COT is a value obtained by rounding up the actual remaining time in the unit of the remaining COT; or the remaining COT is a value obtained by rounding down the actual remaining time in the unit of the remaining COT.

Optionally, the first COT information may be carried by the initial signal, Downlink Control Information (DCI) or sequence.

Optionally, the initial signal may be carried by Physical Downlink Control Channel (PDCCH), or the initial signal is located in the first preset location in the domain of the PDCCH.

Optionally, the sequence is located in the second preset location in the domain of the PDCCH.

A terminal according to an embodiment of the present disclosure can implement the processes of terminal in the embodiment in FIG. 10. To avoid repetition, details are not described herein again.

Figure 11:
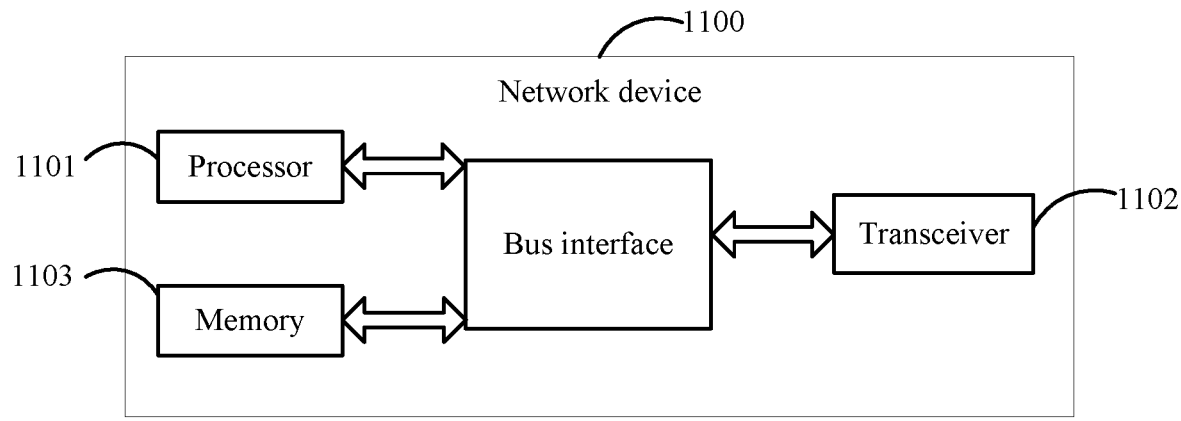
FIG. 11 is a structural diagram of another network device according to an embodiment of the present disclosure.

FIG. 11 is a diagram of another network system structure according to an embodiment of the present disclosure. As shown in FIG. 11, a network device 1100 includes: a processor 1101, a transceiver 1102, a memory 1103 and a bus interface:

a processor 1101, configured to listen channel state; and a transceiver 1102, configured to indicate first channel occupancy time (COT) information when the channel state is idle, where the first COT information is used to indicate a remaining COT of the network device.

Optionally, the transceiver 1102 is specifically used to indicate the first COT information indicated in a first slot, a first partial slot or a first mini-slot for transmission.

Optionally, after the first COT information is indicated in the first slot, partial slot or mini-slot for transmission, the transceiver 1102 is also used to indicate the first COT information periodically.

Optionally, a unit of the period of indicating the first COT information may be millisecond, subframe or slot.

Optionally, the period includes at least one slot, and the first COT information is located in any slot in the period.

Optionally, if the total channel occupancy time of a network device increases, the first COT information indicated in the next period can be obtained based on the first COT information indicated in the previous period and the increased channel occupancy time.

Optionally, a unit of the remaining COT may be millisecond, subframe, slot, mini-slot or symbol.

Optionally, the remaining COT is a value obtained by rounding up the actual remaining time in the unit of the remaining COT; or the remaining COT is a value obtained by rounding down the actual remaining time in the unit of the remaining COT.

Optionally, the first COT information may be carried by the initial signal, Downlink Control Information (DCI) or sequence.

Optionally, the initial signal may be carried by Physical Downlink Control Channel (PDCCH), or the initial signal is located in the first preset location in the domain of the PDCCH.

Optionally, the sequence is located in the second preset location in the domain of the PDCCH.

Optionally, before listening channel state, the transceiver 1102 is also configured to: after the second COT information is received, determine the COT ending time of a neighbor cell network device based on the second COT information. The COT ending time is used to determine the time of listening channel state. The second COT information is sent by the neighbor cell network device, and the second COT information is used to indicate the remaining COT of the neighbor cell network device.

Optionally, the processor 1101 is specifically configured: to listen the channel state at the COT ending time; or to listen the channel state from the previous slot/subframe before the COT ending time.

In FIG. 11, a bus architecture can include any quantity of interconnected buses and bridges, which are specifically connected together by circuits of one or more processors represented by the processor 1101 and a memory represented by the memory 1103. The bus architecture may further connect together various other circuits of a peripheral device, a voltage stabilizer, a power management circuit, and the like, which are known in this art and will not be further described herein. The bus interface provides an interface. The transceiver 1102 may include a plurality of elements, that is, include a transmitter and a receiver, and provide units for communication with various other apparatuses on a transmission medium. For different user equipment, the user interface 1104 may alternatively be an interface for externally and internally connecting required equipment. The connected equipment includes but is not limited to a keypad, a display, a speaker, a microphone, a joystick, and the like.

The processor 1101 is responsible for managing the bus architecture and common processing, and the memory 1103 may store data used when the processor 1101 performs an operation.

Optionally, an embodiment of the present disclosure further provides a network device, including a processor 1101, a memory 1103, and a computer program stored in the memory 1103 and executable on the processor 1101. When the computer program is executed by the processor 1101, the processes of the embodiments of the transmission time indication method for unlicensed band may be implemented, and a same technical effect can be achieved. To avoid repetition, details are not described herein again.

Figure 12:
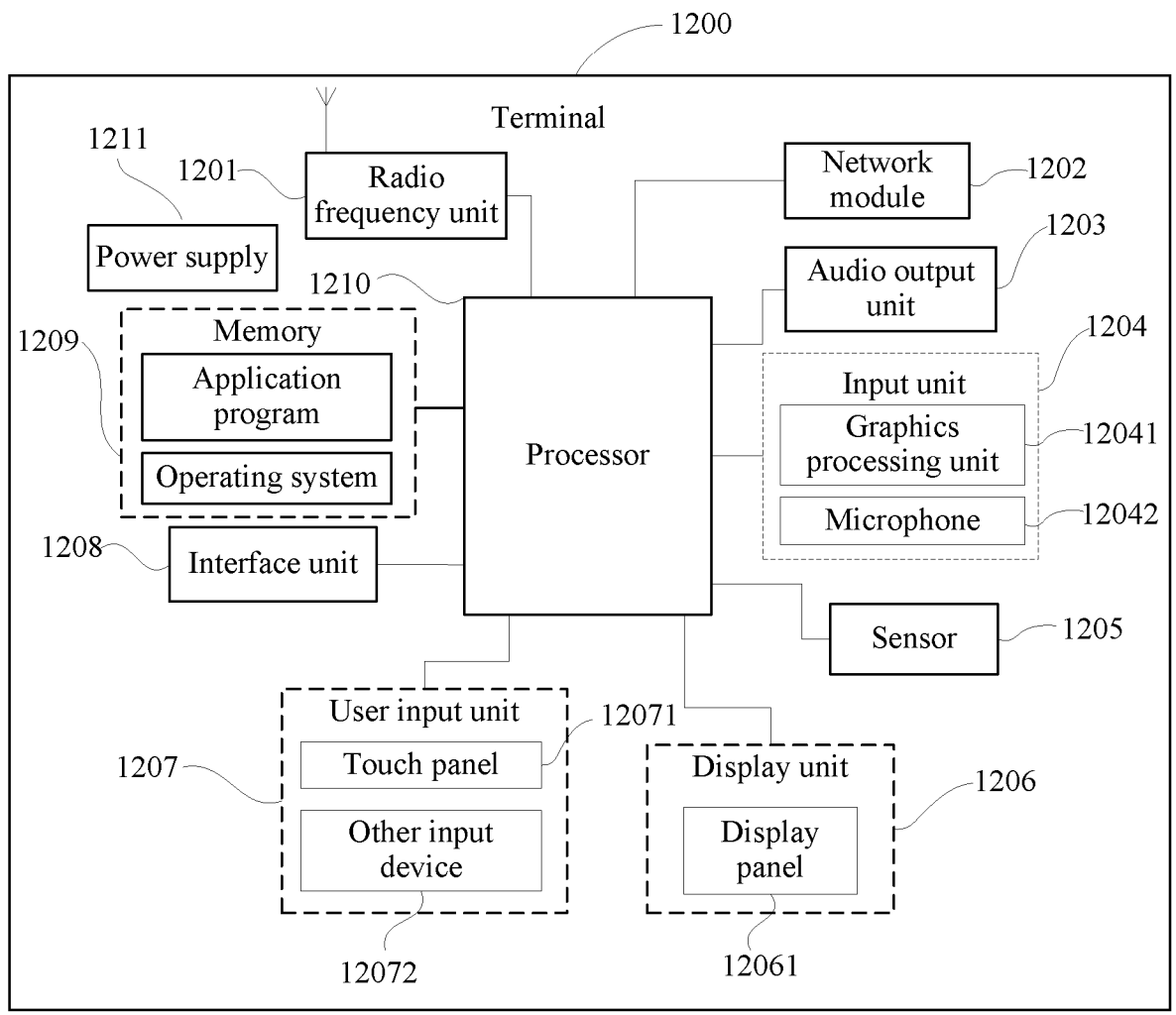
FIG. 12 is a structural diagram of another terminal according to an embodiment of the present disclosure.

FIG. 12 is a schematic diagram of a hardware structure of a terminal according to an embodiment of this disclosure.

The terminal 1200 includes, but is not limited to: a radio frequency unit 1201, a network module 1202, an audio output unit 1203, an input unit 1204, a sensor 1205, a display unit 1206, a user input unit 1207, an interface unit 1208, a memory 1209, a processor 1210 and a power supply 1211. It can be understood by those skilled in the art that the structure of the terminal shown in FIG. 12 does not constitute a limitation on the terminal, and the terminal may include more or fewer components than those shown in the figure, or combine some components, or have different component arrangements. In the embodiments of this disclosure, the terminal includes, but is not limited to, a mobile phone, a tablet computer, a notebook computer, a palmtop computer, a vehicle-mounted terminal, a wearable device, a pedometer, or the like.

A radio frequency unit 1201 is configured to receive the first COT information. The first COT information is used to indicate the remaining COT;

A processor 1210 is configured to perform Physical Downlink Control Channel (PDCCH) blind detection within the remaining COT.

Optionally, the processor 1210 is specifically configured to receive the first COT information indicated in a first slot, a first partial slot or a first mini-slot for transmission.

Optionally, after the first COT information is received in the first slot, partial slot or mini-slot for transmission, the processor 1210 is also configured to receive the first COT information periodically.

Optionally, a unit of the period of the first COT information received may be millisecond, subframe or slot.

Optionally, the period includes at least one slot, and the first COT information is located in any slot in the period.

Optionally, a unit of the remaining COT may be millisecond, subframe, slot, mini-slot or symbol.

Optionally, the remaining COT is a value obtained by rounding up the actual remaining time in the unit of the remaining COT; or the remaining COT is a value obtained by rounding down the actual remaining time in the unit of the remaining COT.

Optionally, the first COT information may be carried by the initial signal, Downlink Control Information (DCI) or sequence.

Optionally, the initial signal may be carried by Physical Downlink Control Channel (PDCCH), or the initial signal is located in the first preset location in the domain of the PDCCH.

Optionally, the sequence is located in the second preset location in the domain of the PDCCH.

It should be understood that in some embodiments of the present disclosure, the radio frequency unit 1201 can be configured to receive and send information or receive and send signal during calls. Specifically, the radio frequency unit 1201 receives downlink data from a base station, and transmits the downlink data to the processor 1210 for processing. In addition, the radio frequency unit 1201 sends uplink data to the base station. Usually, the radio frequency unit 1201 includes but is not limited to an antenna, at least one amplifier, a transceiver, a coupler, a low noise amplifier, a duplexer, and the like. In addition, the radio frequency unit 1201 may communicate with a network and another device through a wireless communication system.

The terminal provides a user with wireless broadband Internet access through the network module 1202, for example, helping the user send and receive emails, browse web pages, and access streaming media.

The audio output unit 1203 may convert audio data received by the radio frequency unit 1201 or the network module 1202 or stored in the memory 1209 into an audio signal and output the audio signal as a sound. Moreover, the audio output unit 1203 may further provide audio output (for example, call signal receiving sound and message receiving sound) related to a specific function performed by the terminal 1200. The audio output unit 1203 includes a speaker, a buzzer, a receiver, and the like.

The input unit 1204 is configured to receive audio or video signals. The input unit 1204 may include a graphics processing unit (Graphics Processing Unit, GPU) 12041 and a microphone 12042. The graphics processing unit 12041 processes image data of a static image or video obtained by an image capture apparatus (such as, a camera) in a video capture mode or an image capture mode. A processed image frame may be displayed on the display unit 1206. An image frame processed by a Graphics Processing Unit 12041 may be stored in the memory 1209 (or another storage medium) or sent by the radio frequency unit 1201 or the network module 1202. The microphone 12042 may receive a sound and can process such sound into audio data. The processed audio data may be converted, in a call mode, into a format that can be sent by using the radio frequency unit 1201 to a mobile communication base station, and the format is output.

The terminal 1200 further includes at least one sensor 1205, such as a light sensor, a motion sensor, and another sensor. Specifically, the light sensor includes an ambient light sensor and a proximity sensor, where the ambient light sensor can adjust brightness of the display panel 12061 based on brightness of ambient light, and the proximity sensor can turn off the display panel 12061 and/or backlight when the terminal 1200 moves towards the ear. As a type of motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), and perform a function related to vibration recognition (such as a pedometer or a knock), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not described herein again.

The display unit 1206 is configured to display information entered by a user or information provided for a user. The display unit 1206 may include a display panel 12061, and the display panel 12061 may be configured in a form of liquid crystal display (liquid crystal display, LCD), organic light-emitting diode (organic light-emitting diode, OLED), or the like.

The user input unit 1207 can be configured to receive the inputted digital or character information, and generate key signal input related to user setting and function control of the terminal. Specifically, the user input unit 1207 includes a touch panel 12071 and another input device 12072. The touch panel 12071, also known as a touch screen, can collect a touch operation performed by a user on or near the touch panel touch panel (for example, an operation performed by the user on the touch panel 12071 or near the touch panel 12071 with any suitable object or accessory such as a finger or a stylus). The touch panel 12071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor the processor 1210, and receives and executes a command from the processor 1210. In addition, the touch panel 12071 may be implemented in various types such as a resistor, a capacitor, an infrared ray, or a surface acoustic wave. The user input unit 1207 may include the another input device 12072 in addition to the touch panel 12071. Specifically, the another input device 12072 may include, but is not limited to, a physical keyboard, a functional button (such as a volume control button, or a power on/off button), a trackball, a mouse, and a joystick. Details are not described herein again.

Further, the touch panel 12071 may cover the display panel 12061. When detecting a touch operation on or near the touch panel 12071, the touch panel 12071 transmits the touch operation to the processor 1210 to determine a type of a touch event, and then the processor 1210 provides corresponding visual output on the display panel 12061 based on the type of the touch event. In FIG. 12, the touch panel 12071 and the display panel 12061 are used as two independent components to implement input and output functions of the terminal. However, in some embodiments, the touch panel 12071 and the display panel 12061 may be integrated to implement the input and output functions of the terminal. This is not specifically limited herein.

The interface unit 1208 is an interface connecting an external apparatus to the terminal 1200. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 1208 may be configured to receive an input (for example, data information and power) from an external apparatus and transmit the received input to one or more elements within the terminal 1200, or may be configured to transmit data between the terminal 1200 and the external apparatus.

The memory 1209 may be configured to store software programs and various data. The memory 1209 may mainly include a program storage area and a data storage area. The program storage area may store an operating system, an application program required for at least one function (such as an audio playing function and an image playing function, etc.) etc. The data storage area may store data (such as audio data and a phone book, etc.) created according to use of the mobile phone. In addition, the memory 1209 may include a high speed random access memory, and may further include a non-volatile memory, such as at least one magnetic disk memory device, a flash memory device, or other non-volatile solid state memory devices.

The processor 1210 is a control center of the terminal, and is connected to all the parts of the entire terminal by using various interfaces and lines. It performs various functions of the terminal and processes data by running or executing the software programs and/or modules stored in the memory 1209 and by invoking data stored in the memory 1209, it performs overall listening of the terminal. The processor 1210 may include one or more processing units. Optionally, the processor 1210 may be integrated with an application processor and a modem processor. The application processor mainly processes the operating system, the user interface, applications, etc. The modem processor mainly processes wireless communication. It may be understood that, alternatively, the modem processor may not be integrated into the processor 1210.

The terminal 1200 may also include a power supply 1211 (for example, a battery) that supplies power to various components. Optionally, the power supply 1211 may be logically connected to the processor 1210 through a power supply management system, to perform functions of managing charging, discharging, and power consumption through the power supply management system.

In addition, the terminal 1200 includes some functional modules not shown. Details are not described herein again.

Optionally, an embodiment of the present disclosure further provides a terminal, including a processor 1210, a memory 1209, and a computer program stored in the memory 1209 and executable on the processor 1210. When the computer program is executed by the processor 1210, the processes of the embodiments of the transmission time indication method for unlicensed band may be implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the embodiments of the a transmission time indication method for unlicensed band at the network device side, or when the computer program is executed by a processor, the processes of the embodiments of the a transmission time indication method for unlicensed band at the terminal side may be implemented, and a same technical effect can be achieved. To avoid repetition, details are not described herein again. The computer-readable storage medium is, for example, a Read-Only Memory (ROM), a Random Access Memory (RAM) or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. In the absence of more restrictions, an element defined by the statement "including a . . . " does not preclude the presence of other identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially, or the part contributing to the related technologies may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a base station, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A transmission time indication method for unlicensed band, applied to a terminal, and comprising:
receiving first channel occupancy time (COT) information, wherein the first COT information is used to indicate a remaining COT, and the remaining COT is remaining channel occupancy time calculated from a slot indicating the first COT information; and
performing physical downlink control channel (PDCCH) blind detection within the remaining COT.

2. The method according to claim 1, wherein the receiving first channel occupancy time COT information comprises:
receiving the first COT information in a first slot, a first partial slot or a first mini-slot for transmission.

3. The method according to claim 2, wherein after the receiving the first COT information in a first slot, a first partial slot or a first mini-slot for transmission, the receiving first channel occupancy time COT information further comprises:
receiving first COT information periodically;
wherein a unit of a period for receiving the first COT information is millisecond, subframe or slot.

4. The method according to claim 3, wherein the period comprises at least one slot, and the first COT information is located in any slot in the period.

5. The method according to claim 1, wherein a unit of the remaining COT is millisecond, subframe, slot, mini-slot or symbol;
wherein the remaining COT is a value obtained by rounding up the actual remaining time in the unit of the remaining COT; or the remaining COT is a value obtained by rounding down the actual remaining time in the unit of the remaining COT.

6. The method according to claim 1, wherein the first COT information is carried by an initial signal, downlink control information (DCI) or a sequence.

7. The method according to claim 6, wherein the initial signal is carried by physical downlink control channel (PDCCH), or the initial signal is located in a first preset location in the domain of the PDCCH;
or,
wherein the sequence is located in a second preset location in the domain of the PDCCH.

8. A network device, comprising: a memory, a processor and a program stored in the memory and executable on the processor, wherein the program is executed by the processor to perform the steps of:
listening channel state; and
when the channel state is idle, indicating first channel occupancy time (COT) information, wherein the first COT information is used to indicate a remaining COT of the network device, and the remaining COT is remaining channel occupancy time calculated from a slot indicating the first COT information.

9. The network device according to claim 8, wherein the processor is configured to:
indicate the first COT information in a first slot, a first partial slot or a first mini-slot for transmission.

10. The network device according to claim 9, wherein after the indicating the first COT information in a first slot, a first partial slot or a first mini-slot for transmission, the processor is configured to:
indicate first COT information periodically;
wherein a unit of a period for indicating the first COT information is millisecond, subframe or slot.

11. The network device according to claim 10, wherein if the total channel occupancy time of a network device increases, the first COT information indicated in the next period is obtained based on the first COT information indicated in the previous period and the increased channel occupancy time.

12. The network device according to claim 8, wherein a unit of the remaining COT is millisecond, subframe, slot, mini-slot or symbol;
wherein the remaining COT is a value obtained by rounding up the actual remaining time in the unit of the remaining COT; or the remaining COT is a value obtained by rounding down the actual remaining time in the unit of the remaining COT.

13. The network device according to claim 8, wherein the first COT information is carried by an initial signal, downlink control information (DCI) or sequence.

14. The network device according to claim 13, wherein the initial signal is carried by physical downlink control channel (PDCCH), or the initial signal is located in the first preset location in the domain of the PDCCH;
or,
wherein the sequence is located in the second preset location in the domain of the PDCCH.

15. The network device according to claim 8, wherein before listening channel state, the processor is configured to:
when second COT information is received, determine a COT ending time of neighbor cell network device based on the second COT information, wherein the COT ending time is used to determine the time for listening channel state, the second COT information is sent by the neighbor cell network device, and the second COT information is used to indicate the remaining COT of the neighbor cell network device.

16. The network device according to claim 15, wherein the processor is configured to:
listen the channel state from the COT end; or
listen the channel state from the previous slot/subframe prior to the COT ending time.

17. A terminal, comprising: a memory, a processor and a program stored in the memory and executable on the processor, wherein the program is executed by the processor to perform the steps of:
receiving first channel occupancy time (COT) information, wherein the first COT information is used to indicate a remaining COT, and the remaining COT is remaining channel occupancy time calculated from a slot indicating the first COT information; and
performing physical downlink control channel (PDCCH) blind detection within the remaining COT.

18. The terminal according to claim 17, wherein the processor is configured to:
receive the first COT information in a first slot, a first partial slot or a first mini-slot for transmission.

19. The terminal according to claim 18, wherein after the receiving the first COT information in a first slot, a first partial slot or a first mini-slot for transmission, the processor is configured to:
 receive the first COT information periodically;
 wherein a unit of a period for receiving the first COT information is millisecond, subframe or slot.

20. The terminal according to claim 17, wherein the first COT information is carried by an initial signal, downlink control information (DCI) or a sequence.

* * * * *